(12) United States Patent
Nakayama

(10) Patent No.: US 9,645,560 B2
(45) Date of Patent: May 9, 2017

(54) POWER CONTROLLER, CONTROL SYSTEM, AND CONTROL METHOD

(75) Inventor: Taku Nakayama, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 594 days.

(21) Appl. No.: 14/113,183

(22) PCT Filed: Apr. 20, 2012

(86) PCT No.: PCT/JP2012/060781
§ 371 (c)(1),
(2), (4) Date: Oct. 21, 2013

(87) PCT Pub. No.: WO2012/144629
PCT Pub. Date: Oct. 26, 2012

(65) Prior Publication Data
US 2014/0046498 A1 Feb. 13, 2014

(30) Foreign Application Priority Data

Apr. 22, 2011 (JP) ................................. 2011-096620

(51) Int. Cl.
*G05D 3/12* (2006.01)
*G05B 15/02* (2006.01)
(Continued)

(52) U.S. Cl.
CPC .............. *G05B 15/02* (2013.01); *H02J 3/383* (2013.01); *H02J 7/35* (2013.01); *H02J 13/0062* (2013.01);
(Continued)

(58) Field of Classification Search
CPC ...... H02J 2003/143; H02J 3/28; G06Q 10/00; Y02B 70/3225; Y02B 60/1282;
(Continued)

(56) References Cited

U.S. PATENT DOCUMENTS 4,324,987 A * 4/1982 Sullivan, II ............... H02J 3/14
307/35
6,148,623 A * 11/2000 Park .................... G01M 99/005
62/129
(Continued)

FOREIGN PATENT DOCUMENTS

EP 2477308 A1 7/2012
JP 2007-176618 A 7/2007
(Continued)

OTHER PUBLICATIONS

International Search Report for PCT/JP2012/060781, mailed May 22, 2012.
(Continued)

*Primary Examiner* — Darrin Dunn
(74) *Attorney, Agent, or Firm* — Procopio Cory Hargreaves and Savitch LLP

(57) ABSTRACT

A power controller is provided in a consumer having a load equipment and controls an operation of the load equipment. The power controller comprises: an acquisition unit that acquires a plurality of operation modes for determining an operation status of the load equipment, or acquires operation parameters configuring each of the plurality of operation modes and being for controlling the load equipment; a setting unit that sets any of the plurality of operation modes of the load equipment; a provisional operation control unit that provisionally operates the load equipment on the basis of the plurality of operation modes; and a measurement unit that measures, for each of the plurality of operation modes, a provisional power consumption consumed by the load equipment, during the provisional operation of the load equipment.

13 Claims, 5 Drawing Sheets

(51) Int. Cl.
*H02J 3/38* (2006.01)
*H02J 7/35* (2006.01)
*H02J 13/00* (2006.01)
H02J 3/14 (2006.01)

(52) U.S. Cl.
CPC . *G05B 2219/2642* (2013.01); *H02J 2003/143* (2013.01); *Y02B 70/3216* (2013.01); *Y02B 70/3241* (2013.01); *Y02B 70/3266* (2013.01); *Y02B 90/2638* (2013.01); *Y02E 10/563* (2013.01); *Y02E 10/566* (2013.01); *Y02E 40/72* (2013.01); *Y04S 10/123* (2013.01); *Y04S 20/221* (2013.01); *Y04S 20/227* (2013.01); *Y04S 20/242* (2013.01); *Y04S 40/124* (2013.01)

(58) Field of Classification Search
CPC ............ G05B 15/02; G05B 2219/2642; G06F 1/3203; G06F 1/3287; G06F 1/28
See application file for complete search history.

(56) References Cited

U.S. PATENT DOCUMENTS

| | | | | |
|---|---|---|---|---|
| 8,918,224 | B2* | 12/2014 | Shin | H02J 3/14 700/286 |
| 2002/0162032 | A1* | 10/2002 | Gundersen | H02J 3/14 713/300 |
| 2003/0033268 | A1* | 2/2003 | Muthya | G06F 11/2094 |
| 2003/0182958 | A1* | 10/2003 | Gray | F25D 29/00 62/229 |
| 2003/0233201 | A1* | 12/2003 | Horst | H02J 3/14 700/295 |
| 2005/0116836 | A1* | 6/2005 | Perry | H04Q 9/00 340/870.02 |
| 2006/0095164 | A1* | 5/2006 | Donnelly | H02J 3/14 700/295 |
| 2008/0147827 | A1* | 6/2008 | Morris | H04L 12/2821 709/220 |
| 2008/0184230 | A1* | 7/2008 | Leech | G06F 9/505 718/100 |
| 2010/0088261 | A1* | 4/2010 | Montalvo | H02J 3/14 706/15 |
| 2011/0032423 | A1* | 2/2011 | Jing | H04L 12/282 348/552 |
| 2011/0112780 | A1* | 5/2011 | Moss | G01D 4/002 702/62 |
| 2011/0145611 | A1* | 6/2011 | Lee | G01R 22/10 713/320 |
| 2011/0153106 | A1* | 6/2011 | Drake | H02J 3/14 700/295 |
| 2011/0282504 | A1* | 11/2011 | Besore | H02J 3/14 700/291 |
| 2012/0296489 | A1* | 11/2012 | Lee | H02J 3/008 700/297 |
| 2012/0316693 | A1 | 12/2012 | Ogawa et al. | |
| 2014/0278248 | A1* | 9/2014 | Whittle | G05B 23/0283 702/184 |
| 2015/0134136 | A1* | 5/2015 | Lydecker | H05B 37/0227 700/295 |

FOREIGN PATENT DOCUMENTS

| | | |
|---|---|---|
| JP | 2007-327656 A | 12/2007 |
| JP | 2009-259125 A | 11/2009 |
| JP | 2010-161828 A | 7/2010 |
| JP | 2010-161848 A | 7/2010 |
| JP | 2011-038705 A | 2/2011 |
| WO | 2011/030200 A1 | 3/2011 |

OTHER PUBLICATIONS

Written Opinion for PCT/JP2012/060781, mailed May 22, 2012.
The extended European search report issued by the European Patent Office on Mar. 30, 2015, which corresponds to European Patent Application No. 12774562.8-1804 and is related to U.S. Appl. No. 14/113,183.
Communication pursuant to Rules 70(2) and 70a(2) EPC issued by the European Patent Office on Apr. 16, 2015, which corresponds to European Patent Application No. 12774562.8-1804 and is related to U.S. Appl. No. 14/113,183.

* cited by examiner

FIG. 3

| OPERATION MODE | OPERATION PARAMETER | POWER CONSUMPTION |
|---|---|---|
| OPERATION MODE 1 (QOL OPERATION) | SUMMER (JULY TO SEPTEMBER): COOLING, 22°C, AUTOMATIC AIR VOLUME CONTROL | 1000W |
| | WINTER (JANUARY TO MARCH): HEATING, 28°C, AUTOMATIC AIR VOLUME CONTROL | 1010W |
| | SPRING/FALL (APRIL TO JUNE, OCTOBER TO DECEMBER): OUTDOOR TEMPERATURE 22°C OR MORE, COOLING, 22°C, AUTOMATIC AIR VOLUME CONTROL | 1000W |
| | SPRING/FALL (APRIL TO JUNE, OCTOBER TO DECEMBER): OUTDOOR TEMPERATURE 18°C OR LESS, HEATING, 18°C, AUTOMATIC AIR VOLUME CONTROL | 990W |
| | SPRING/FALL (APRIL TO JUNE, OCTOBER TO DECEMBER): OUTDOOR TEMPERATURE 18 TO 22°C, VENTILATION, AUTOMATIC AIR VOLUME CONTROL | 950W |
| OPERATION MODE 2 (POWER SAVING LEVEL 1) | SUMMER (JULY TO SEPTEMBER): COOLING, 24°C, AUTOMATIC AIR VOLUME CONTROL | 900W |
| | WINTER (JANUARY TO MARCH): HEATING, 26°C, AUTOMATIC AIR VOLUME CONTROL | 910W |
| | SPRING/FALL (APRIL TO JUNE, OCTOBER TO DECEMBER): OUTDOOR TEMPERATURE 24°C OR MORE, COOLING, 24°C, AUTOMATIC AIR VOLUME CONTROL | 900W |
| | SPRING/FALL (APRIL TO JUNE, OCTOBER TO DECEMBER): OUTDOOR TEMPERATURE 16°C OR LESS, HEATING, 16°C, AUTOMATIC AIR VOLUME CONTROL | 890W |
| | SPRING/FALL (APRIL TO JUNE, OCTOBER TO DECEMBER): OUTDOOR TEMPERATURE 16 TO 24°C, VENTILATION, AUTOMATIC AIR VOLUME CONTROL | 850W |
| ... | ... | ... |
| OPERATION MODE 5 (POWER SAVING LEVEL 4) | SUMMER (JULY TO SEPTEMBER): COOLING, 30°C, AUTOMATIC AIR VOLUME CONTROL | 600W |
| | WINTER (JANUARY TO MARCH): HEATING, 20°C, AUTOMATIC AIR VOLUME CONTROL | 610W |
| | SPRING/FALL (APRIL TO JUNE, OCTOBER TO DECEMBER): OUTDOOR TEMPERATURE 30°C OR MORE, COOLING, 30°C, AUTOMATIC AIR VOLUME CONTROL | 600W |
| | SPRING/FALL (APRIL TO JUNE, OCTOBER TO DECEMBER): OUTDOOR TEMPERATURE 10°C OR LESS, HEATING, 10°C, AUTOMATIC AIR VOLUME CONTROL | 590W |
| | SPRING/FALL (APRIL TO JUNE, OCTOBER TO DECEMBER): OUTDOOR TEMPERATURE 10 TO 30°C, VENTILATION, AUTOMATIC AIR VOLUME CONTROL | 550W |

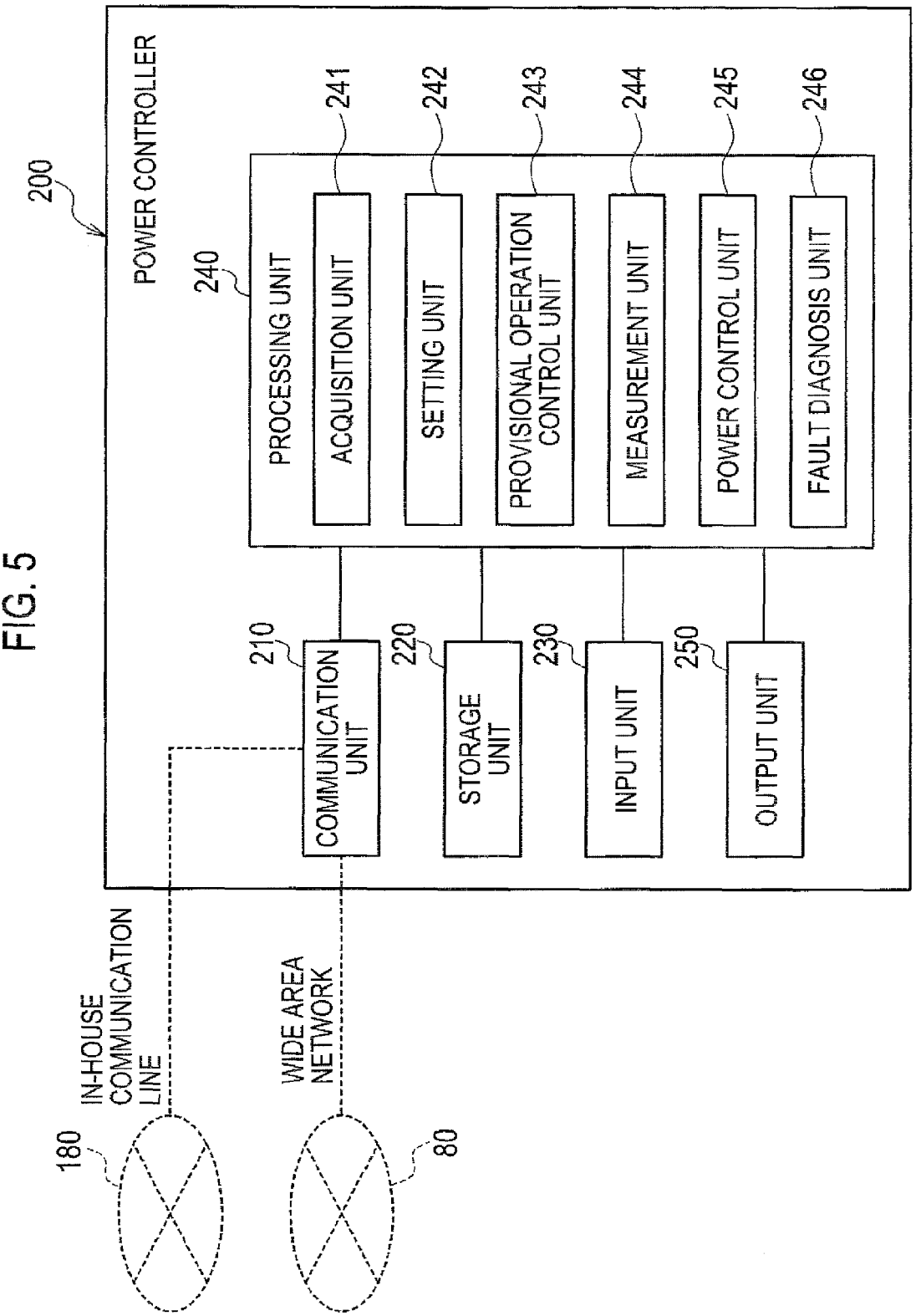

POWER CONTROLLER, CONTROL SYSTEM, AND CONTROL METHOD

TECHNICAL FIELD

The present invention relates to a power controller that is provided in a consumer having a load equipment and controls an operation of the load equipment, a control system therefor, and a control method thereof.

BACKGROUND ART

In recent years, the demand for energy conservation increases not only in the society and the enterprises, but also among consumers such as an ordinary family. In the midst of these movements, it is being introduced a power controller that is called HEMS (Home Energy Management System) for collectively managing a distributed power source such as a photovoltaic cell provided at home and a power consumption of a load equipment such as a household electrical appliance (see PTL 1, for example).

According to such a power controller, it is possible not only to optimally control power supplied from the distributed power source to the load equipment in accordance with a power demand, but also to suppress a power consumption in the consumer, thereby achieving aggressive energy conservation.

CITATION LIST

Patent Literature

PTL 1: Japanese Patent Application Publication No. 2009-259125

SUMMARY OF THE INVENTION

However, the power controller according to the conventional technology has the following problems. That is, in order to appropriately control the power consumption of the load equipment by the power controller, it is necessary to recognize an operation parameter for determining an operation status of the load equipment and a power consumption consumed when the load equipment is operated according to the operation parameter.

A large number of operation parameters are often set in the load equipment. For example, when an air-conditioning system such as an air-conditioner is adopted as an example, there are many operation parameters such as a temperature, a humidity, an air volume, and a wind direction. Therefore, when the power controller controls the power consumption of the load equipment while managing each of the operation parameters of the load equipment, a processing load will be increased.

As a method of solving such a problem, it may be possible that a plurality of operation modes are provided, and operation parameters configuring each of the plurality of operation modes are determined beforehand according to the amount of the power consumption. According to such a method, it is possible to simplify the control of the load equipment by means of the plurality of operation modes without managing each of the respective operation parameters of the load equipment. Therefore, it is possible to suppress the processing load.

However, the power consumption of the load equipment may differ depending on each installation environment of the load equipment. For example, when an air-conditioning system is adopted as an example, the power consumption of even the same air-conditioning system may be different during an operation, depending on, for example, the area of a room where the air-conditioning system is provided. Therefore, it is difficult to accurately recognize the power consumption consumed when the load equipment is operated.

Thus, in the power controller according to the conventional technology, it is possible to suppress the processing load generated in controlling the load equipment, but it is not possible to accurately recognize the power consumption of the load equipment. Therefore, there is a problem that it is not possible to appropriately control the power consumption of the load equipment in the consumer.

Therefore, the present invention has been achieved in order to solve the above-described problems, and an object thereof is to provide a power controller, a control system, and a control method with which it is possible to suppress a processing load generated in controlling a load equipment, and to more appropriately control a power consumption of the load equipment in a consumer having the load equipment.

In order to solve the above-described problems, the present invention has following features. First, the first feature of the present invention is summarized as follows. A power controller (power controller 200) that is provided in a consumer (consumer 10) having a load equipment (e.g., air-conditioning system 132) and controls an operation of the load equipment, comprises: an acquisition unit (acquisition unit 241) that acquires a plurality of operation modes for determining an operation status of the load equipment, or acquires operation parameters configuring each of the plurality of operation modes and being for controlling the load equipment; a setting unit (setting unit 242) that sets any of the plurality of operation modes of the load equipment; a provisional operation control unit (provisional operation control unit 243) that provisionally operates the load equipment on the basis of the plurality of operation modes; and a measurement unit (measurement unit 244) that measures, for each of the plurality of operation modes, a provisional power consumption consumed by the load equipment, during the provisional operation of the load equipment.

The second feature of the present invention according to the above-described feature is summarized as follows. The acquisition unit determines whether it is possible to acquire, from the load equipment, the plurality of operation modes or the operation parameters that configure each of the plurality of operation modes, and upon determination that it is not possible to acquire the operation modes or the operation parameters, acquires the operation modes or the operation parameters, either from an external device (e.g., system-side controller 50) or on the basis of an input operation of a user.

The third feature of the present invention according to the above-described feature is summarized as follows. The setting unit reconfigures any of the plurality of operation modes according to a change result of an operation parameter changed on the basis of the input operation of the user.

The fourth feature of the present invention according to the above-described feature is summarized as follows. The provisional operation control unit provisionally operates the load equipment, in any of: a time zone of a low power demand in the consumer, a time zone of a large power supply, and a time zone of a low power rate.

The fifth feature of the present invention according to the above-described feature is summarized as follows. When a plurality of load equipments provided in the consumer are provisionally operated, the provisional operation control unit gradually changes: the number of load equipments to be provisionally operated and/or an operation mode of the load equipments to be provisionally operated so as to gradually increase a total power consumption during the provisional operation.

The sixth feature of the present invention according to the above-described feature is summarized as follows. When the operation of the load equipment is performed according to any of the plurality of operation modes after measuring the provisional power consumption, the measurement unit measures an actual power consumption consumed by the load equipment.

The seventh feature of the present invention according to the above-described feature is summarized as follows. The power controller further comprises: a communication unit (communication unit 210) that communicates with a system-side controller (system-side controller 50) that controls the power supplied from a power system (power system 20) to a consumer group including the consumer, wherein the communication unit transmits the actual power consumption measured by the measurement unit to the system-side controller.

The eighth feature of the present invention according to the above-described feature is summarized as follows. The power controller further comprises: a fault diagnosis unit that diagnoses a fault of the load equipment, on the basis of a difference between the provisional power consumption and the actual power consumption or a difference between the actual power consumptions measured at different time points.

The ninth feature of the present invention according to the above-described feature is summarized as follows. A control system that controls an operation of a load equipment provided in a consumer, comprises: an acquisition unit that acquires a plurality of operation modes for determining an operation status of the load equipment, or acquires operation parameters configuring each of the plurality of operation modes and being for controlling the load equipment; a setting unit that sets any of the plurality of operation modes of the load equipment; a provisional operation control unit that provisionally operates the load equipment on the basis of the plurality of operation modes; and a measurement unit that measures, for each of the plurality of operation modes, a provisional power consumption consumed by the load equipment, during the provisional operation of the load equipment.

The tenth feature of the present invention according to the above-described feature is summarized as follows. A control method for controlling an operation of a load equipment provided in a consumer by a power controller, comprises: an acquisition step of acquiring a plurality of operation modes for determining the operation status of the load equipment, or acquiring operation parameters that configure each of the plurality of operation modes and that are for controlling the load equipment; a setting step of setting any of the plurality of operation modes of the load equipment; a provisional operation step of provisionally operating the load equipment on the basis of the plurality of operation modes; and a measurement step of measuring, for each of the plurality of operation modes, a provisional power consumption consumed by the load equipment, during the provisional operation of the load equipment.

BRIEF DESCRIPTION OF THE DRAWINGS

FIG. 3 is a diagram for explaining an information table according to the embodiment of the present invention.

FIG. 5 is a block diagram of the power controller 200 according to according to the fourth modification of the present invention.

DESCRIPTION OF THE EMBODIMENT

Figure 1:
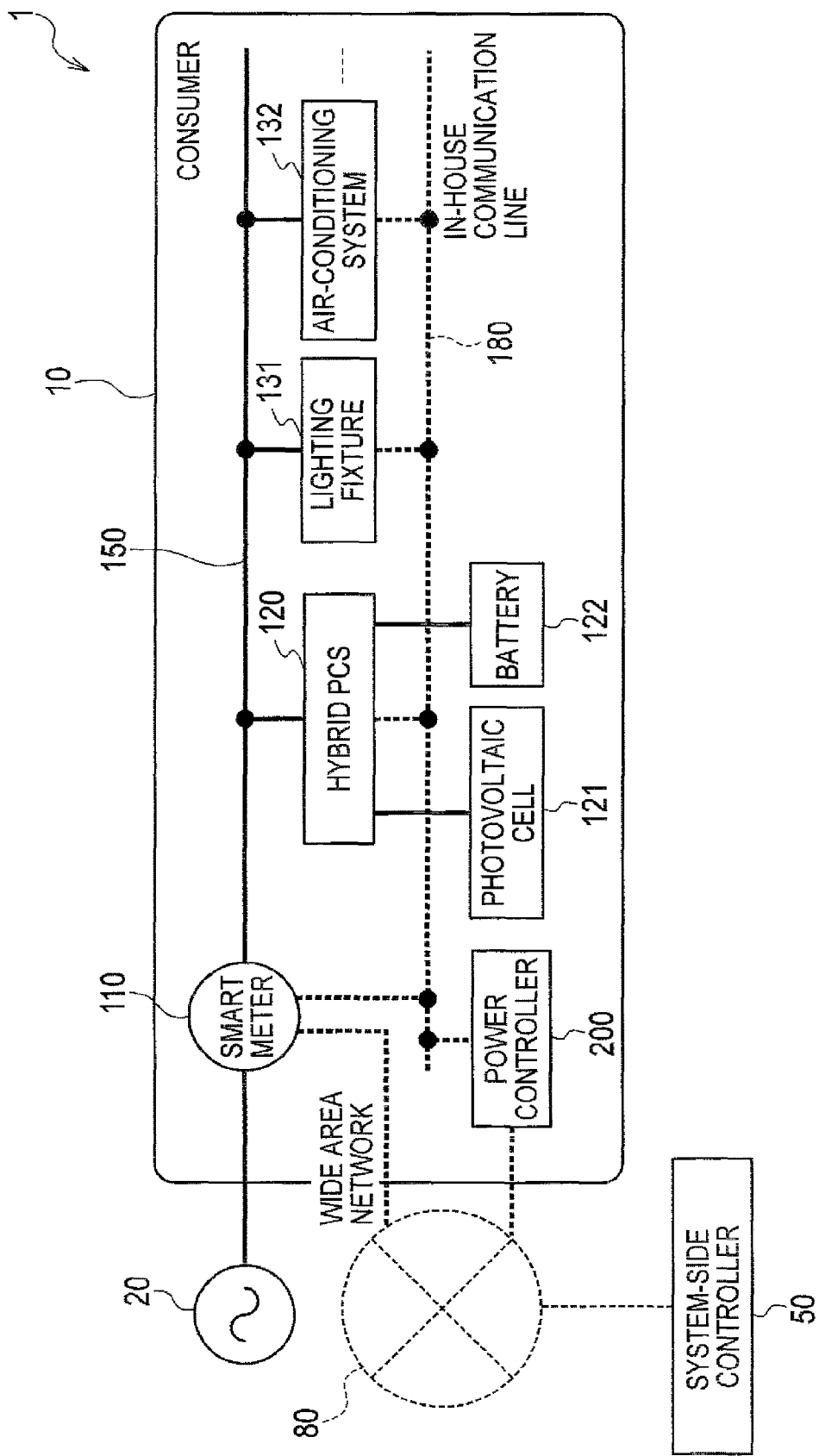
FIG. 1 is an outline view of the configuration of a power control system 1 according to the embodiment of the present invention.

Next, with reference to the drawings, the embodiment of the present invention will be described. Specifically, the description will be given in order of: (1) Configuration of power control system, (2) Configuration of power controller, (3) Operation of power controller, (4) Operation and effect, (5) First modification according to the present embodiment, (6) Second modification according to the present embodiment, (7) Third modification according to the present embodiment, (8) Third modification according to the present embodiment and (9) Other embodiments. In the drawings of the embodiments, the same or similar reference signs are applied to the same or similar portions.

(1) Configuration of Power Control System

FIG. 1 is an outline view of the configuration of a power control system 1 according to the present embodiment. The power control system 1 is provided in a consumer 10 such as an ordinary family, and is capable of performing power control on a device in the consumer 10.

As shown in FIG. 1, the power control system 1 includes a smart meter 110, a hybrid PCS 120, a photovoltaic cell 121, a battery 122, a load equipment (such as an lighting fixture 131 and an air-conditioning system 132), and a power controller 200. The power control system 1 may include a battery installed in an electric vehicle, for example. The photovoltaic cell 121 receives solar light so as to generate DC power in accordance with the received solar light. Furthermore, the lighting fixture 131 is considered to be an LED lamp that is able to control output luminance of the lighting fixture. The load equipment is not limited thereto. For example, more load equipments such as a refrigerating device and a heat accumulator may be provided, and on the contrary, one load equipment may be provided.

The smart meter 110 measures a total power consumption that is a sum of power consumed by the load equipment in the power control system 1. The smart meter 110 is capable of notifying a system-side controller 50 of the measured total power consumption via a wide area network 80. The system-side controller 50 is considered to be a device called CEMS (Community Energy Management System).

The hybrid PCS 120 is connected to an in-house distribution line 150, and connected to the photovoltaic cell 121, used as a distributed power source, and the battery 122. The hybrid PCS 120 runs the photovoltaic cell 121 and the battery 122, according to control of the power controller 200.

The hybrid PCS 120 is capable of storing the power generated by the photovoltaic cell 121 into the battery 122. The hybrid PCS 120 is capable of converting AC power supplied from the in-house distribution line 150 into DC power to store the DC power into the battery 122.

The hybrid PCS 120 is capable of converting the DC power discharged from the battery 122 and the DC power generated by the photovoltaic cell 121, into the AC power to be sent out to the in-house distribution line 150. AC power sent out to the in-house distribution line 150 is appropriately used in the lighting fixture 131 and/or the air-conditioning system 132. Alternatively, the power generated by the photovoltaic cell 121 serves as a reverse power flow to a power system 20.

The lighting fixture 131 and the air-conditioning system 132, as the load equipment, are connected to the in-house distribution line 150 and to an in-house communication line 180. The load equipment performs an operation according to the control of the power controller 200.

The power controller 200 is provided in the consumer 10, and performs power control on each device in the consumer. The power controller 200 communicates with the smart meter 110, the hybrid PCS 120, the lighting fixture 131, and the air-conditioning system 132, via the in-house communication line 180. The communications can be radio communication or wired communications (including power line communication).

Furthermore, the power controller 200 communicates with the system-side controller 50 that controls the power supplied to the consumer group including the consumer 10, via the wide area network 80. The power controller 200 is capable of receiving control information including a power rate, and the like, for the power of the power system 20 from the system-side controller 50, and controlling the operation of the load equipment in the power control system 1 on the basis of the received control information.

Furthermore, the power controller 200 controls the operation of the load equipment on the basis of a predetermined number of operation modes. In this case, the operation mode is information for determining the operation status of the load equipment defined according to the amount of the power consumption of the load equipment.

In the present embodiment, as the predetermined number of operation modes, five operation modes 1 to 5 are determined. The power controller 200 utilizes the operation modes 1 to 5 in controlling the operation of the load equipment. Among the operation modes 1 to 5, a mode of a larger number is set to consume a lower amount of the power consumption when the load equipment is operated.

For example, the power controller 200 is instructed to suppress the power consumption at most from the system-side controller 50, the power controller 200 is capable of controlling so as to operate the load equipment in the operation mode 5 with the least power consumption. The configuration and the operation modes of the power controller 200 will be described in details later.

(2) Configuration of Power Controller

Figure 2:
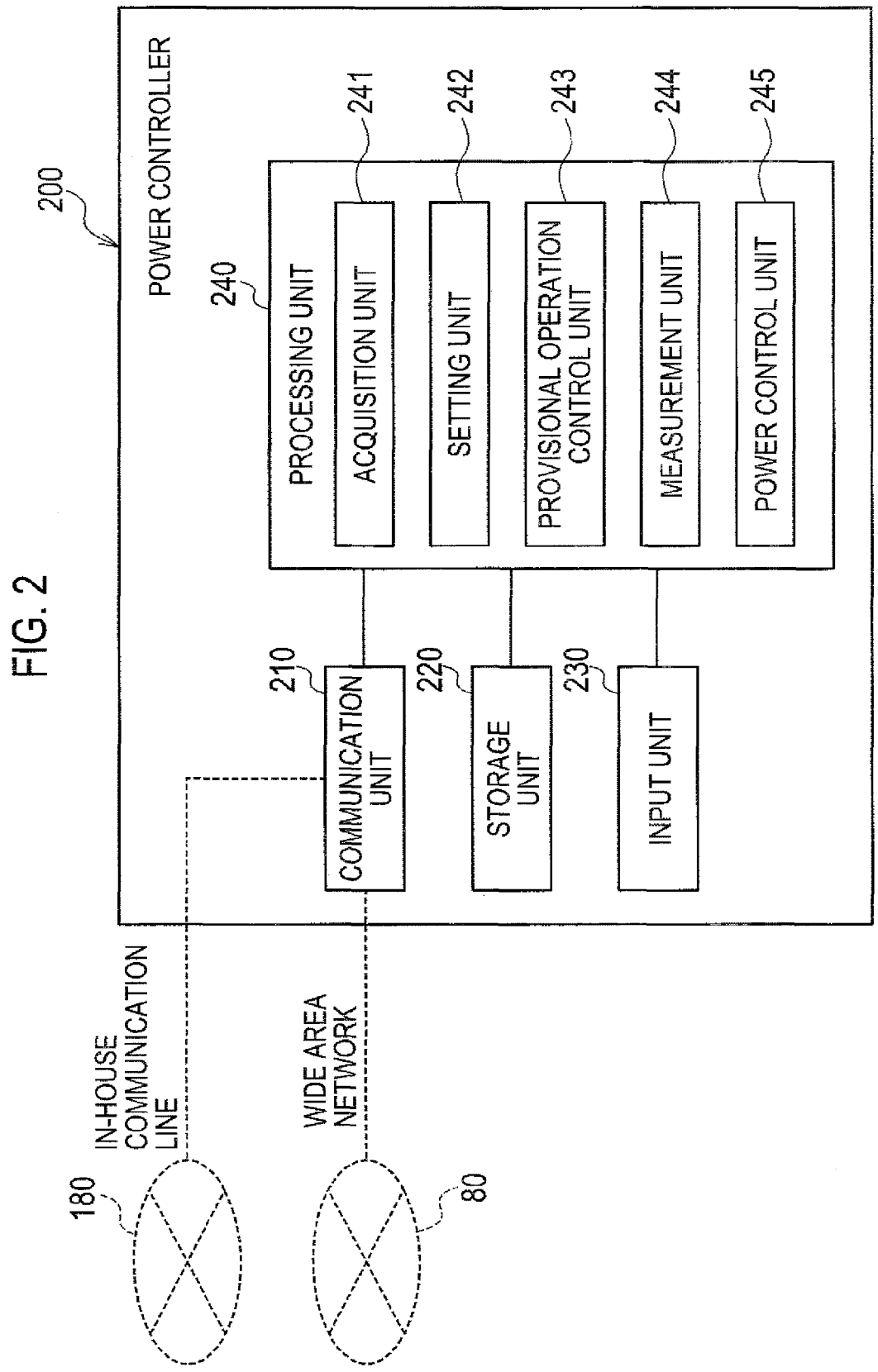
FIG. 2 is a block diagram showing the configuration of the power controller according to the embodiment of the present invention.

The configuration of the power controller 200 is described with reference to FIG. 2. FIG. 2 is a block diagram showing the configuration of the power controller 200. As shown in FIG. 2, the power controller 200 includes a communication unit 210, a storage unit 220, an input unit 230, and a processing unit 240.

The communication unit 210 is connected to the in-house communication line 180 and the wide area network 80. The communication unit 210 communicates with devices such as the load equipment via the in-house communication line 180. The communication unit 210 communicates with the system-side controller 50 via the wide area network 80.

The storage unit 220 stores a program performed by the processing unit 240, and is used as a work area during the program execution by the processing unit 240.

Furthermore, the storage unit 220 according to the present embodiment stores an information table which associates an "operation mode", an "operation parameter", and a "power consumption" with one another. Specifically, a description will be given with reference to FIG. 3. In FIG. 3, one example of the information table for the air-conditioning system 132 is shown.

Here, in the information table stored in the storage unit 220, the "operation mode" is information used for controlling the operation of the load equipment. In the present embodiment, five "operation modes", that is, "operation modes 1 to 5" are defined according to the amount of the power consumption of the load equipment. The respective operation modes 1 to 5 are configured by operation parameters for controlling the load equipment. The number of the "operation modes" is not limited to five. More operation modes may be provided and less operation modes may be provided.

The "operation parameter" is information indicating the operation status of the load equipment, and stored in association with each of the "operation modes 1 to 5". In the "operation parameter" according to the present embodiment, information for identifying heating/cooling/ventilation operation in association with conditions such as seasons (spring, summer, fall, or winter) and outdoor temperature, and temperature (temperature setting) information are stored as operation parameters of the air-conditioning system 132.

In the "power consumption", power consumptions consumed when the load equipment is operated according to operation parameters corresponding to the respective operation modes 1 to 5 are stored. The power consumptions stored in the "power consumption" are values measured by the processing unit 240 (a measurement unit 244).

In FIG. 3, one example of the information table for the operation parameters of the air-conditioning system 132 is shown, however, the storage unit 220 also stores an information table for another load equipment.

The input unit 230 functions as a user interface at the time of the operation of the power controller 200 by a user. Furthermore, the input unit 230 is capable of accepting a change of operation parameters from a user to the load equipment. For example, the input unit 230 is capable of accepting a change of temperature setting (for example, from 28° C. to 27° C.) in such a case where a user changes the temperature setting of the air-conditioning system 132.

The processing unit 240 performs a process in accordance with a program stored in the storage unit 22. Furthermore, the processing unit 240 includes an acquisition unit 241, a setting unit 242, a provisional operation control unit 243, a measurement unit 244, and a power control unit 245.

The acquisition unit 241 acquires a plurality of operation modes for determining the operation status of the load equipment, or acquires operation parameters that are for controlling the load equipment and that are respectively configuring the plurality of operation modes. Here, in the present embodiment, the case where the acquisition unit 241 acquires operation parameters will be described as an example.

When a load equipment is newly connected to the in-house distribution line 150 and the in-house communication line 180 in the consumer 10, the acquisition unit 241 detects the load equipment. For example, in a case where a communication scheme is SEP 2.0 of the Zigbee scheme or the like, the acquisition unit 241 is capable of detecting the device by broadcasting, through the in-house communication line 180, a command to which responses are returned only from newly-connected devices at certain intervals. Alternatively, in a case where the communication scheme is the ECHONET/ECHONET Lite scheme or the like, the acquisition unit 241 is capable of detecting the device by voluntarily broadcasting, through the in-house communication line 180, information notifying that the newly-connected device has participated in a network, and having the communication unit 210 receive the information.

The acquisition unit 241 acquires device identification information from the detected load equipment for identifying the detected load equipment. For example, the device identification information is at least one of a manufacturer and its ID, a type and a category of the device, a model number and a manufacturing number of the device, and a device name. Furthermore, the device identification information may include reference destination address information such as URL from which those device information can be obtained. Furthermore, the acquisition unit 241 determines whether it is possible to acquire operation parameters from the load equipment.

For example, the acquisition unit 241 requests the air-conditioning system 132 to transmit operation parameters, when the air-conditioning system 132 is newly connected. The acquisition unit 241 determines that it is acquirable when the operation parameters have been able to be acquired from the air-conditioning system 132. On the other hand, the acquisition unit 241 determines that it is not acquirable when the operation parameters have not been able to be acquired from the air-conditioning system 132, and acquires the operation parameters from an external device. Specifically, the acquisition unit 241 transmits request information including the device identification information to the system-side controller 50 serving as the external device, and acquires operation parameters from the system-side controller 50. If a reference destination URL is included in the device identification information, the acquisition unit 241 may transmit the request information to a reference destination indicated by the URL, and may acquire operation parameters.

In addition to the system-side controller 50, when a database server for operation parameters and the like is separately provided, the acquisition unit 241 may acquire operation parameters of the load equipment from the database server.

Furthermore, the acquisition unit 241 may acquire the operation parameters of the load equipment on the basis of an input operation of a user when the operation parameters have not been able to be acquired from the load equipment. Specifically, the acquisition unit 241 may acquire, as the operation parameter of the load equipment, the value of operation parameter input in the input unit 230 by a user.

The setting unit 242 sets one of the plurality of operation modes of the load equipment. Specifically, the setting unit 242 creates an information table in the storage unit 220 when the operation parameters of the load equipment have been acquired by the acquisition unit 241.

Furthermore, the setting unit 242 classifies the operation parameters of the load equipment acquired by the acquisition unit 241 into five. For example, when the operation parameter of the air-conditioning system 132 is a temperature of the heating operation, the setting unit 242 specifies a temperature range 20 to 28° C. of the heating operation and classifies the temperature range into five corresponding to the operation modes 1 to 5. Specifically, the temperature range is classified as follows: 28° C. as the operation mode 1, 26° C. as the operation mode 2, 24° C. as the operation mode 3, 22° C. as the operation mode 4, and 20° C. as the operation mode 5.

Furthermore, the setting unit 242 associates the operation modes 1 to 5 with operation parameters corresponding to the respective operation modes 1 to 5, and stores them in the information table. These operation parameters will serve as pieces of information determining the operation status of the load equipments including the lighting fixture 131 and the air-conditioning system 132.

The provisional operation control unit 243 provisionally operates the load equipment on the basis of the plurality of operation modes 1 to 5. Specifically, when operation parameters are stored for the respective operation modes 1 to 5 by the setting unit 242, the provisional operation control unit 243 sequentially instructs the load equipment to perform a provisional operation according to the operation parameters corresponding to the respective operation modes 1 to 5.

Furthermore, it is preferable for the provisional operation control unit 243 to perform the provisional operation of the load equipment, in any of: a time zone of a low power demand in the consumer 10, a time zone of a large power supply, and a time zone of a low power rate. The provisional operation in such time zones is beneficial from the viewpoint of costs, effective use of power, and the like.

The time zone of a low power demand includes nighttime, the time of a user's absence, or the like. The time zone of a large power supply includes the time of clear weather and at which a power generation amount of the photovoltaic cell 121 is large, or the like. The time zone of a low power rate includes, for example, a time zone in which the power rate becomes lower than a predetermined rate on the basis of information on, for example, TOU (Time of Use) determined depending on each time zone and RTP (Real Time Pricing) determined in real time.

The measurement unit 244 measures, for each of the operation modes 1 to 5, power (hereinafter, "provisional power consumption") consumed by the load equipment during the provisional operation of the load equipment. Specifically, the measurement unit 244 measures provisional power consumptions when the load equipment is operated according to the operation parameters corresponding to the respective operation modes 1 to 5, by the instruction of the provisional operation control unit 243. Furthermore, the measurement unit 244 associates the measured power consumptions with the operation parameters of the respective operation modes 1 to 5 and stores the associated power consumptions in an information table of the storage unit 220.

The measurement unit 244 may measure a power consumption at an outlet (not shown) through which the load equipment connects to the in-house distribution line 150, or at an in-house distribution panel (not shown), on measuring the power consumption of the load equipment. The measurement unit 244 may measure a power consumption at any location where the power consumption of the single load equipment can be measured.

The power control unit 245 controls power in the consumer 10. Specifically, the power control unit 245 optimizes the power consumption in the consumer 10, on the basis of the total power consumption of the consumer 10 measured by the smart meter 110 and/or the power generation amount of the photovoltaic cell 121 acquired from the hybrid PCS 120, or the like. Furthermore, the power control unit 245 specifies one operation mode among the operation modes 1 to 5 in controlling the power consumption of the load equipment.

At this time, the power control unit 245 controls the operation of the load equipment on the basis of the plurality of operation modes 1 to 5 and the provisional power consumptions corresponding to the respective operation modes 1 to 5. Specifically, the power control unit 245 specifies an operation mode to use for the operation of the load equipment on the basis of a value of the "power consumption" stored in association with the "operation mode", with reference to the information table stored in the storage unit 220. Furthermore, the power control unit 245 instructs the load equipment to operate on the basis of an operation parameter corresponding to the specified operation mode.

For example, if the load equipment in the consumer 10 is operated within a range of a power generation amount W of the photovoltaic cell 121, the power control unit 245 specifies an operation mode in which the power consumption of the load equipment is within the range of the power generation amount W and instructs the load equipment to operate on the basis of information on the operation parameter corresponding to the specified operation mode.

Moreover, the power control unit 245 has a calendar function and is connected to an outdoor temperature sensor (not shown), thereby being capable of acquiring an outdoor temperature. The power control unit 245 is capable of instructing the load equipment to operate on the basis of the operation parameters corresponding to the respective operation modes 1 to 5, depending on conditions such as the seasons and the outdoor temperature.

(3) Operation of Power Controller

Figure 4:
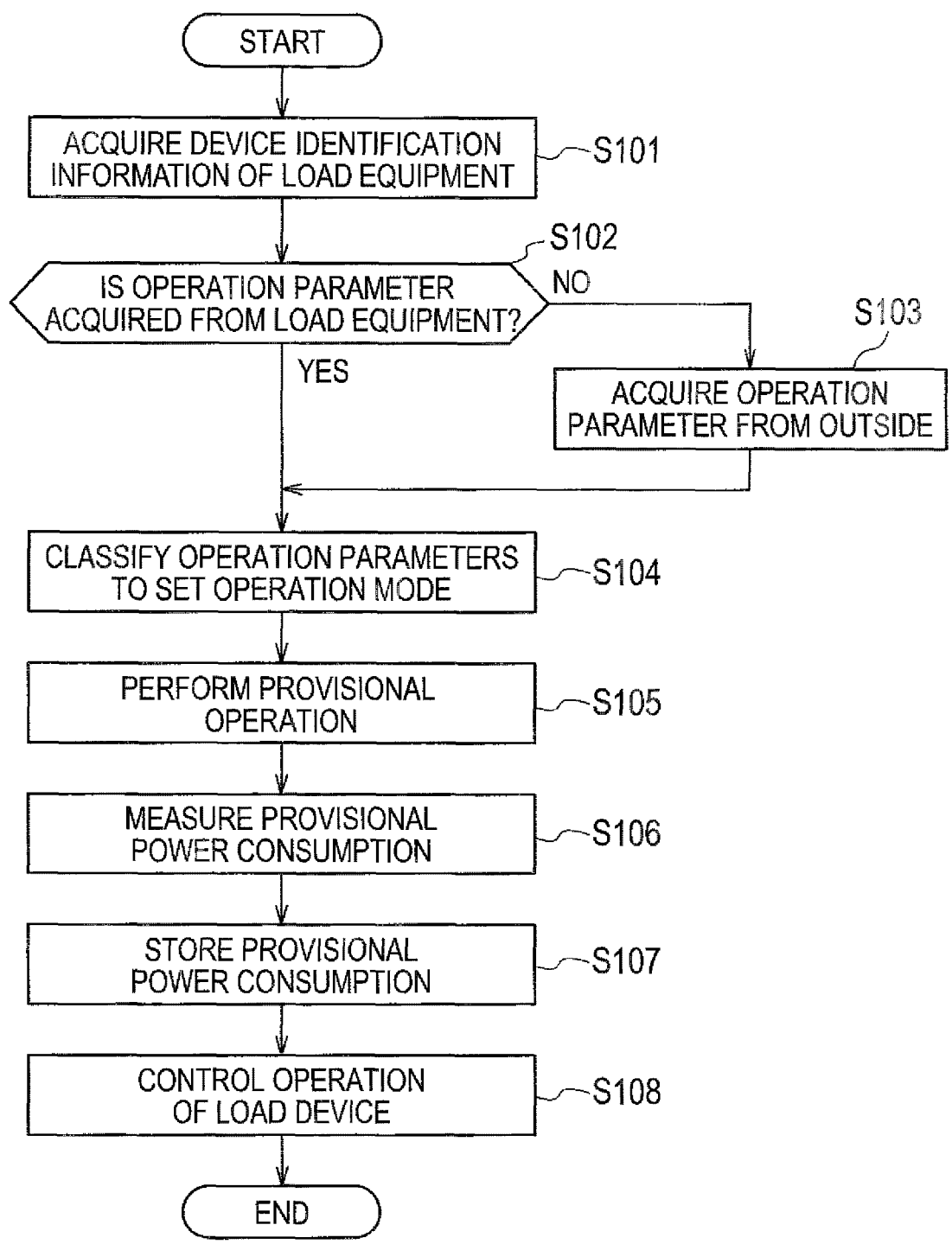
FIG. 4 is a flow diagram showing the operation of the power controller according to the embodiment of the present invention.

Next, the operation of the power controller 200 will be described. FIG. 4 is a flow diagram showing the operation of the power controller 200. Here, in FIG. 4, the operation performed by the power controller 200, when the air-conditioning system 132 that is one of the load equipments is newly connected in the power control system 1, is shown.

In step S101, the acquisition unit 241 acquires device identification information from the air-conditioning system 132 on detecting that the air-conditioning system 132 is newly connected to the power control system 1 (the in-house communication line 180).

In step S102, the acquisition unit 241 determines whether operation parameters can be acquired from the air-conditioning system 132. Specifically, the acquisition unit 241 requests the air-conditioning system 132 to transmit operation parameters. The power controller 200 performs an operation in step S104 if the operation parameters have been able to be acquired from the air-conditioning system 132.

In step S103, for example, when the acquisition unit 241 determines that the operation parameters have not been able to be acquired from the air-conditioning system 132, the acquisition unit 241 acquires operation parameters corresponding to the air-conditioning system 132 from an external device. Specifically, the acquisition unit 241 transmits request information for the operation parameter including the device identification information to the system-side controller 50, and acquires the operation parameters from the system-side controller 50.

Thus, through steps S102 and S103, the acquisition unit 241 acquires the operation parameters for determining the operation status of the air-conditioning system 132. For example, when another air-conditioning system similar to the existing air-conditioning system 132 is added to the consumer 10, the acquisition unit 241 may acquire the operation parameter of the air-conditioning system 132 already stored in the information table as operation parameter of the other air-conditioning system.

In step S104, the setting unit 242 classifies the plurality of types of the operation parameters of the air-conditioning system 132 into a predetermined number previously determined and sets the plurality of operation modes 1 to 5.

Specifically, the setting unit 242 creates an information table in the storage unit 220. The setting unit 242 classifies the plurality of types of the operation parameters of the air-conditioning system 132 acquired by the acquisition unit 241 into five operation parameters according to an estimated power consumption, and stores the classified operation parameters in association with the respective operation modes 1 to 5.

In step S105, the provisional operation control unit 243 provisionally operates the air-conditioning system 132 and the lighting fixture 131 for each of the operation parameters corresponding to the operation modes 1 to 5. Specifically, the provisional operation control unit 243 acquires the operation parameters corresponding to the respective operation modes 1 to 5 stored in the information table with reference to the storage unit 220. The provisional operation control unit 243 instructs the air-conditioning system 132 to perform a provisional operation on the basis of the operation parameters corresponding to the operation modes 1 to 5.

In step S106, the measurement unit 244 measures power consumptions corresponding to the respective operation modes 1 to 5 when the provisional operation of the air-conditioning system 132 is performed in accordance with the instruction of the provisional operation control unit 243. The measurement unit 244 may measure power consumptions to calculate an average value while the provisional operation is performed. The period of the provisional operation in each of the operation modes 1 to 5 may be several seconds to several tens of seconds.

In step S107, the measurement unit 244 associates the power consumptions measured for each of the operation modes 1 to 5 with the respective operation modes 1 to 5, and stores the associated power consumptions in the information table of the storage unit 220.

In step S108, the power control unit 245 controls the operation of the load equipment, such as the air-conditioning system 132, on the basis of the operation modes 1 to 5 and the operation parameters and provisional power consumptions corresponding to the respective operation modes 1 to 5. Specifically, the power control unit 245 refers to the information table stored in the storage unit 220, in controlling the power consumption of the load equipment in the consumer 10. Furthermore, the power control unit 245 specifies an operation mode on the basis of a value of the "power consumption" stored in association with the "operation mode" in the information table. Moreover, the power control unit 245 instructs the load equipment, such as the air-conditioning system 132, to operate on the basis of an operation parameter corresponding to the specified operation mode.

Subsequently, the setting unit 242 may reconfigure the operation parameter according to the change result of the operation parameter changed on the basis of an input operation of a user. For example, when the air-conditioning system 132 performs an operation in the operation mode 1 on the basis of an operation parameter of the heating operation and 28° C., the setting unit 242 may reconfigure the temperature stored in association with the operation mode 1 to a temperature (for example, 27° C.) changed by a user when the input unit 230 has accepted a change of the temperature of the air-conditioning system 132 by the user (for example, a change from 28° C. to 27° C.).

(4) Operation and Effect

In the power controller 200 according to the above-described embodiment, operation parameters for configuring an operation mode of the load equipment are acquired when the load equipment is connected to the power control system 1. The power controller 200 classifies the acquired operation parameters into five operation modes 1 to 5 determined beforehand and sets an operation mode for determining the operation status of the load equipment.

According to the power controller 200, even when the load equipment has a plurality of types of operation parameters, the operation parameters are classified into operation parameters corresponding to the five operation modes 1 to 5 to be managed. Therefore, in the power controller 200, the plurality of types of operation parameters can be collectively adjusted according to the operation modes 1 to 5, without a need of adjusting each of the operation parameters, thus a processing load for controlling the operation of the load equipment can be suppressed.

Furthermore, according to the power controller 200, the provisional operation of the load equipment is performed on the basis of the operation parameter set for each of the plurality of operation modes 1 to 5 and a provisional power consumption is acquired. Therefore, in the power controller 200, a process of calculating the respective power consumptions of the load equipment from a design value becomes unnecessary, so that a processing load used for the calculation can be suppressed.

Moreover, in the power controller 200 according to the present embodiment, the power consumption of the load equipment for each of the operation modes 1 to 5 is not calculated from the design value but acquired from an actually-measured value of the provisional operation. Therefore, the power controller 200 according to the present embodiment has recognized the power consumption of the load equipment for each of the operation modes 1 to 5 more precisely, thereby being capable of controlling the power consumption of the load equipment in the consumer 10 more precisely.

Particularly, when the load equipment is the air-conditioning system 132, an actual power consumption is considered to be different from a power consumption calculated from the design value, depending on what kind of a room (for example, a kitchen or a living room) where the air-conditioning system 132 is provided, and the installation environments such as the area of a room. The power controller 200 according to the present embodiment acquires the power consumption from the actually-measured value of the provisional operation, thereby being useful for the case like this.

Furthermore, in accordance with the power controller 200 according to the present embodiment, even when the operation parameters corresponding to the load equipment cannot be acquired from the load equipment, action parameters can be acquired from an external device such as the system-side controller 50 or on the basis of an input operation of a user, so that it is possible to more reliably acquire the operation parameters.

(5) First Modification According to the Present Embodiment

Next, a first modification according to the present embodiment will be described. The power controller 200 according to the above-described embodiment has associated and stored provisional power consumptions during a provisional operation as power consumptions corresponding to the operation modes 1 to 5. However, the accuracy of the provisional power consumption is considered to be low because the provisional power consumption measured during the provisional operation is a measurement result in a short time.

The measurement unit 244 according to the present modification measures an actual power consumption consumed by the load equipment, when the operation of the load equipment is performed according to one of the predetermined number of the operation modes 1 to 5 (for example, the operation mode 1), after measuring the provisional power consumption. That is, in the power controller 200 according to the present modification, the measurement unit 244 measures a more accurate actual power consumption by re-measuring a power consumption consumed when the load equipment is actually operated.

Furthermore, the measurement unit 244 associates the measured actual power consumption with the operation mode at the re-measuring (for example, the operation mode 1), and stores the associated power consumption in the information table of the storage unit 220. At this time, the measurement unit 244 may store a flag indicating either of the "provisional power consumption" or the "actual power consumption", so as to determine whether a power consumption stored for the "power consumption" in the information table is the "provisional power consumption" or the "actual power consumption".

Subsequently, the power control unit 245 controls the operation of the load equipment on the basis of the operation mode and the actual power consumption in controlling the operation of the load equipment. Thus, the power control unit 245 is capable of performing power control of the load equipment in the consumer 10 on the basis of the more accurate actual power consumption.

The communication unit 210 may transmit the actual power consumption measured by the measurement unit 244 to the system-side controller 50. In this way, the system-side controller 50 is notified of the actual power consumption from each consumer 10, thereby becoming capable of more precisely operating power management for a subordinate consumer group. Particularly, when the system-side controller 50 has been capable of recognizing the actual power consumption corresponding to the operation mode of each consumer, the system-side controller 50 is capable of specifying an appropriate operation mode corresponding to power supply from the power system 20 in instructing each consumer 10 to perform power saving or the like, thereby being capable of operating optimal power saving.

(6) Second Modification According to the Present Embodiment

Next, a second modification according to the present embodiment will be described. The power controller 200 according to the above-described embodiment has been configured to manage operation parameters and power consumptions corresponding to the respective operation modes 1 to 5. However, a user is considered to frequently change the operation parameters. In such a case, the power controller 200 may add a new operation mode.

For example, when the air-conditioning system 132 performs, on the basis of the operation mode 1, an operation according to an operation parameter such as heating, temperature at 28° C., and automatic air volume control, the setting unit 242 may add, in the information table, the new operation mode (for example, an operation mode 1.5) configured by an operation parameter (the heating, the temperature at 27° C., and the automatic air volume control) corresponding to the change result when the input unit 230 of the power controller 200 has accepted a change of the temperature of the air-conditioning system 132 by a user (for example, a change from 28° C. to 27° C.) for more than a predetermined number of times.

Furthermore, when the new operation mode is added, the setting unit 242 notifies the provisional operation control unit 243 of the addition of the new operation mode, and the provisional operation control unit 243 may instruct the air-conditioning system 132 to perform a provisional operation on the basis of an operation parameter corresponding to the new operation mode. In this case, the measurement unit 244 measures provisional power consumption corresponding to the new operation mode during the provisional operation, associates the new operation mode, the operation parameter, and the actually-measured power consumption with one another, and stores them in the information table of the storage unit 220.

On the other hand, when the new operation mode is added, if the air-conditioning system 132 actually operates, the setting unit 242 notifies the measurement unit 244 to that effect. The measurement unit 244 measures an actual power consumption corresponding to the new operation mode on the basis of the notification. In this case, the measurement unit 244 associates the new operation mode, the operation parameter, and the actually-measured power consumption with one another, and stores them in the information table of the storage unit 220.

In accordance with the power controller 200 according to the present modification, an operation mode can be newly added in response to an input operation of a user, an optimal operation mode is generated to suit user preference, and the provisional power consumption or actual power consumption corresponding to the new operation mode can be measured and stored in the storage unit 220.

(7) Third Modification According to the Present Embodiment

Next, a fourth modification according to the present embodiment will be described. In the above-described embodiment, a case where the power controller 200 performs a provisional operation for one load equipment in any of: the time zone of a low power demand, the time zone of a large power supply, and the time zone of a low power rate has been described. However, it is not limited to the case where the one load equipment is provisionally operated, and the power controller 200 may provisionally operate a plurality of load equipments.

In this case, an efficient provisional operation in a period as short as possible is required. On the other hand, when a large number of load equipments are provisionally operated in an operation mode with a large power consumption at the same time, a total power consumption may exceed an allowable value (hereinafter, "power allowable value") and a breaker may be activated.

Therefore, in the present modification, the provisional operation control unit 243 firstly performs a provisional operation on the condition that a power consumption is predicted to be small, under the situation in which an actual power consumption is not recognized. For example, a part of the plurality of load equipments subject to a provisional operation are provisionally operated in an operation mode with a smallest power consumption. The measurement unit 244 measures a power consumption (provisional power consumption) during the first provisional operation for each load equipment.

When the first provisional operation is completed, the provisional operation control unit 243 increases the number of the load equipments to be provisionally operated at the same time, and/or changes the operation mode of the load equipments to be provisionally operated into an operation mode that consumes a second largest power consumption next to that in the first provisional operation. Thus, the provisional operation control unit 243 gradually changes the number of the load equipments to be provisionally operated and/or the operation mode of the load equipments to be provisionally operated, so as to gradually increase the total power consumption during the provisional operation.

In such a process of continuously performing the provisional operation, when predicting the total power consumption during the provisional operation exceeds the power allowable value, the provisional operation control unit 243 reduces the number of the load equipments to be provisionally operated at the same time.

Thus, according to the present modification, the number of the load equipments to be provisionally operated and/or the operation mode of the load equipments to be provisionally operated are gradually changed so as to gradually increase the total power consumption during the provisional operation, so that it is possible to provisionally operate the plurality of load equipments with efficiency and in a short time while preventing the total power consumption in the provisional operation from exceeding the power allowable value.

(8) Fourth Modification According to the Present Embodiment

Next, a fourth modification according to the present embodiment will be described. In the above-described embodiment, the operation of the power controller 200 at an initial installation (initial connection) of the load equipment has been mainly described. However, the information table stored in the storage unit 220 can be used not only for controlling the load equipment, but for diagnosing a fault (or abnormality) of the load equipment.

FIG. 5 is a block diagram of the power controller 200 according to the present modification. As shown in FIG. 5, the power controller 200 includes a fault diagnosis unit 246 that diagnoses a fault of the load equipment on the basis of the "power consumption" included in the information table stored in the storage unit 220. The fault diagnosis unit 246 determines that a fault has occurred in the load equipment, when the power consumption of the load equipment has significantly changed in spite of the same operation mode (that is, the same operation parameter).

For example, as to a load equipment, the fault diagnosis unit 246 determines that a fault has occurred in the load equipment, when a difference between a power consumption (provisional power consumption) measured in a provisional operation in a predetermined operation mode and a power consumption (actual power consumption) measured in an actual operation in the predetermined operation mode exceeds a predetermined threshold value. In contrast, when the difference is equal to or smaller than the threshold value, the information table is updated (that is, overwritten) with the power consumption (actual power consumption) measured in the actual operation.

Alternatively, as to a load equipment, the fault diagnosis unit 246 determines that a fault has occurred in the load equipment, when a difference between a power consumption (actual power consumption A) measured in an actual operation in a predetermined operation mode at a certain time point and a power consumption (actual power consumption B) measured in the actual operation in the predetermined operation mode at a time point subsequent to the time point exceeds a predetermined threshold value. In contrast, when the difference is equal to or smaller than the threshold value, the information table is updated (that is, overwritten) with the latest power consumption (actual power consumption B).

Here, in order to increase the accuracy for the diagnosis, the case where the difference between the power consumptions exceeds the threshold value in only one operation mode may not be determined as a fault, however, the case where the difference between the power consumptions exceeds the threshold value in a plurality of operation modes may be determined as a fault.

When the fault diagnosis unit 246 detects a fault of the load equipment, the fault diagnosis unit 246 controls an output unit 250 provided in the power controller 200 such that the output unit 250 outputs a warning message regarding the load equipment. When the output unit 250 is a display, the fault diagnosis unit 246 may control the output unit 250 such that the output unit 250 outputs images, characters, or the like for prompting replacement or repair of the load equipment. When the output unit 250 is a speaker, the fault diagnosis unit 246 may control the output unit 250 such that the output unit 250 outputs voices for prompting replacement or repair of the load equipment.

Alternatively, when the fault diagnosis unit 246 detects a fault of the load equipment, the fault diagnosis unit 246 controls the communication unit 210 such that the communication unit 210 transmits a warning message regarding the load equipment to a predetermined destination. The predetermined destination may be a communication terminal of a user, or may be a communication terminal of a manufacturer or a repairer.

Thus, according to the present modification, it is possible to automatically detect a fault of the load equipment and to notify, for example, a user of the fault.

(9) Other Embodiments

As described above, the present invention has been described according to the embodiment. However, it must not be understood that the discussions and the drawings constituting a part of this disclosure limit the present invention. From this disclosure, various alternative embodiments, examples and operational techniques are apparent to those skilled in the art.

For example, in the above-described embodiment, the power controller 200 has been configured to set an operation mode for each load equipment, however may set an operation mode for each room by grouping a plurality of load equipments provided in each room. In this case, the information table of the storage unit 220 stores the operation modes 1 to 5, operation parameters of the respective plurality of load equipments, and the total value of power consumptions of the plurality of load equipments in association with one another.

Furthermore, in the above-described embodiment, the case where the acquisition unit 241 acquires operation parameters for controlling the load equipment and the setting unit 242 classifies the operation parameters into operation modes has been described. However, the acquisition unit 241 may acquire the operation mode itself set by a plurality of operation parameters. That is, the acquisition unit 242 may acquire the operation mode and the operation parameters classified so as to be associated with the operation mode.

In addition, in the above-described embodiment, the photovoltaic cell 121 and the battery 122 have been described as an example for the distributed power source. However, the distributed power source may be another power generation device such as wind power generation.

Moreover, in the above-described embodiment, the whole or a part of functions of the power controller 200 may be provided in another device such as the smart meter 110.

The functions of the power controller 200 according to the above-described embodiment can be applied to not only HEMS (Home Energy Management System) but also various systems in the smart grid technology, such as BEMS (Building and Energy Management System). Further, in the above-described embodiment, at least apart of processes performed by the power controller 200 may be performed by the system-side controller 50.

As described above, it must be understood that the present invention includes various embodiments and the like that are not described herein.

The entire content of the Japanese Patent Application No. 2011-096620 (filed on Apr. 22, 2011) is incorporated herein by reference.

INDUSTRIAL APPLICABILITY

As described above, the power controller, the control system, and the control method according to present invention is useful in the power control technology such as the smart grid, with which it is possible to suppress a processing load generated in controlling a load equipment, and to more appropriately control a power consumption of the load equipment in a consumer having the load equipment.

The invention claimed is:
1. A power controller that is provided in a consumer having a load equipment and controls an operation of the load equipment, the power controller comprising at least one processor that, after the load equipment is newly connected to the power controller:
acquires a plurality of operation modes for determining an operation status of the load equipment, or acquires operation parameters configuring each of the plurality of operation modes and being for controlling the load equipment;
provisionally operates the load equipment in each of the plurality of operation modes in sequence; and,
during the provisional operation of the load equipment in each of the plurality of operation modes in sequence, measures a provisional power consumption consumed by the load equipment while operating in that operation mode,
wherein, when an actual power consumption of the load equipment is unknown, the at least one processor
predicts a power consumption of each of the plurality of operation modes, and
performs the provisional operation of the load equipment in each of the plurality of operation modes, in an order of the predicted power consumptions, beginning with one of the plurality of operation modes that has a smallest predicted power consump- tion and ending with one of the plurality of operation modes that has a largest predicted power consumption, and wherein the provisional operation of the load equipment is delayed until a scheduled or predetermined time period.

2. The power controller according to claim 1, wherein the at least one processor:

determines whether it is possible to acquire, from the load equipment, the plurality of operation modes or the operation parameters configuring each of the plurality of operation modes; and, upon a determination that it is not possible to acquire the operation modes or the operation parameters, acquires the operation modes or the operation parameters, either from an external device or on the basis of an input operation of a user.

3. The power controller according to claim 2, wherein the at least one processor reconfigures any of the plurality of operation modes according to a change result of an operation parameter changed on the basis of the input operation of the user.

4. The power controller according to claim 1, wherein the scheduled or predetermined time period comprises at least one of:

a time during which power demand in the consumer is expected to be lower than at a current time, a time during which a power supply is expected to be higher than at the current time, and a time during which a power rate is lower than a predetermined rate.

5. The power controller according to claim 1, wherein the at least one processor, after measuring the provisional power consumption, measures an actual power consumption consumed by the load equipment.

6. The power controller according to claim 5, wherein the at least one processor further communicates with a system-side controller that controls the power supplied from a power system to a consumer group including the consumer, wherein the communication comprises transmitting the actual power consumption to the system-side controller.

7. The power controller according to claim 5, wherein the at least one processor further diagnoses a fault of the load equipment, based on a difference between the provisional power consumption and the actual power consumption or a difference between the actual power consumptions measured at different time points.

8. The power controller according to claim 1, wherein operating the load equipment in each of the plurality of operation modes in sequence comprises, for each of the plurality of operation modes, operating the load equipment for a predetermined amount of time.

9. The power controller according to claim 1, wherein acquiring a plurality of operation modes or acquiring operation parameters configuring each of the plurality of operation modes comprises:

acquiring at least one operation parameter for the load equipment; and classifying possible values of the at least one operation parameter into the plurality of operation modes.

10. The power controller according to claim 1, wherein the at least one processor:

stores the provisional power consumption measured for each of the plurality of operations mode in a memory; and controls an operation of the load equipment based on the measured provisional power consumption for a respective operation mode stored in the memory.

11. A control system that controls an operation of a load equipment provided in a consumer, the control system comprising at least one processor that, after the load equipment is newly connected:

acquires a plurality of operation modes for determining an operation status of the load equipment, or acquires operation parameters configuring each of the plurality of operation modes and being for controlling the load equipment;

provisionally operates the load equipment in each of the plurality of operation modes in sequence; and, during the provisional operation of the load equipment in each of the plurality of operation modes in sequence, measures a provisional power consumption consumed by the load equipment while operating in that operation mode, wherein, when an actual power consumption of the load equipment is unknown, the at least one processor predicts a power consumption of each of the plurality of operation modes, and performs the provisional operation of the load equipment in each of the plurality of operation modes, in an order of the predicted power consumptions, beginning with one of the plurality of operation modes that has a smallest predicted power consumption and ending with one of the plurality of operation modes that has a largest predicted power consumption, and wherein the provisional operation of the load equipment is delayed until a scheduled or predetermined time period.

12. A control method for controlling an operation of a load equipment provided in a consumer by a power controller, the control method comprising: acquiring a plurality of operation modes for determining the operation status of the load equipment, or acquiring operation parameters that configure each of the plurality of operation modes and that are for controlling the load equipment;

provisionally operating the load equipment in each of the plurality of operation modes in sequence; and, during the provisional operation of the load equipment in each of the plurality of operation modes in sequence, measuring a provisional power consumption consumed by the load equipment while operating in that operation mode by, when an actual power consumption of the load equipment is unknown, predicting a power consumption of each of the plurality of operation modes, and performing the provisional operation of the load equipment in each of the plurality of operation modes, in an order of the predicted power consumptions, beginning with one of the plurality of operation modes that has a smallest predicted power consumption and ending with one of the plurality of operation modes that has a largest predicted power consumption, wherein the provisional operation of the load equipment is delayed until a scheduled or predetermined time period.

13. The control method according to claim 12, further comprising:

storing the provisional power consumption measured for each of the plurality of operations mode in a memory; and controlling an operation of the load equipment based on the measured provisional power consumption for a respective operation mode stored in the memory.

* * * * *